Jan. 5, 1954  K. J. SHOMBER  2,664,611
FASTENING DEVICE
Filed April 15, 1952  2 Sheets-Sheet 1
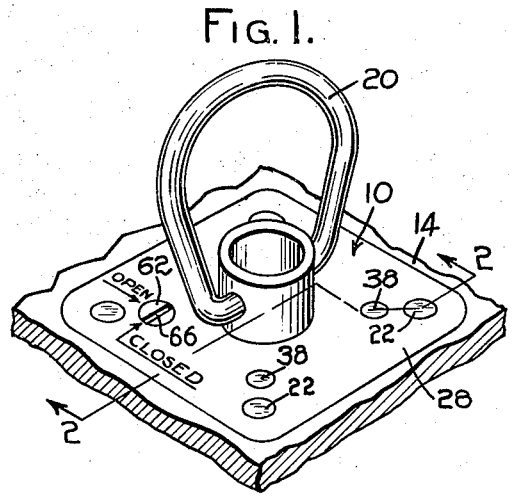
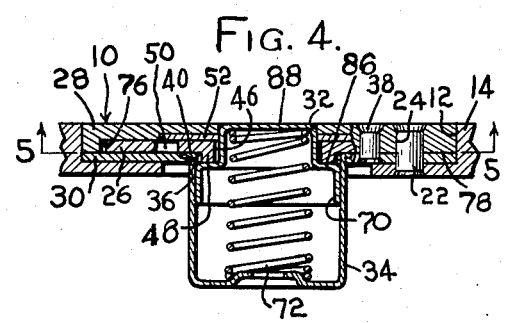
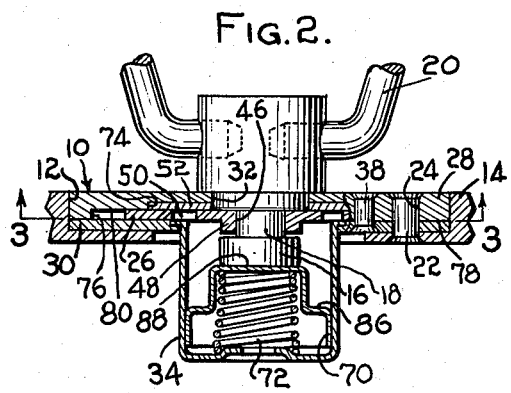
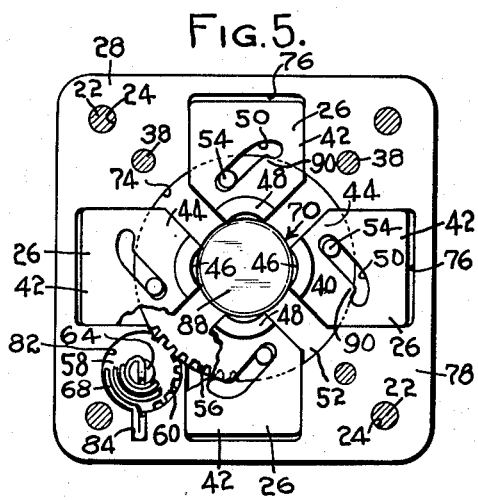
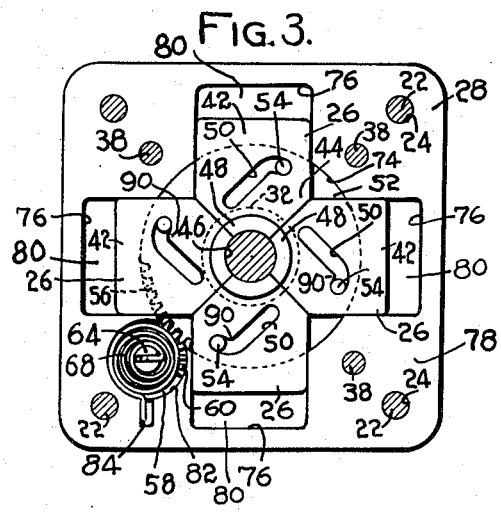
INVENTOR:
KERIAN J. SHOMBER,
BY Philip E. Parker
ATTORNEY.

Patented Jan. 5, 1954

2,664,611

UNITED STATES PATENT OFFICE 2,664,611

FASTENING DEVICE

Kerian J. Shomber, Oakland, Calif., assignor to United-Carr Fastener Corporation, Cambridge, Mass., a corporation of Massachusetts Application April 15, 1952, Serial No. 282,298

9 Claims. (Cl. 24—211)

My invention relates generally to connecting and fastening means and more particularly, though not exclusively, to quick acting, readily releasable fasteners which may be advantageously employed for detachably securing cargo, seats, or equipment in the hold of an airplane.

The principal objects of my present invention are generally to improve upon and simplify the construction of the prior art quick acting, readily releasable connecting and fastening devices; further to provide a fastener of simple, strong, compact and durable structure, which is quick acting in its closing function, capable of being easily and quickly released, and which may be advantageously employed for detachably securing chairs, tables, and the like to the floor, also for detachably connecting and securing parts of structures, such as walls, floors, partitions, panels and the like, also for knockdown structures, such as boxes, cabinets and shelfing, for cargo tie-downs and for the suspension of heavy objects and the like.

In another aspect, a principal object of my invention is to provide an improved quick acting, readily releasable connecting and fastening device that is simple of construction, yet easy to manufacture and at the same time extremely rugged in construction, and capable of resisting very large forces.

Another object of my invention is to provide an improved quick acting, readily releasable connecting and fastening device adapted for quick release upon the simple manipulation of a locking member that may include one or more of the following features: a spring biased member for keeping the socket opening of the device covered or closed; a spring biased member for maintaining stud-gripping jaw members in an open position upon the manipulation of a locking member to move such jaw members to open position; a spring biased member for providing an ejecting force to a stud member upon manipulation of the locking member to move such jaw members to open position.

Other objects of my invention will be apparent from the following description and drawings, which illustrate a preferred embodiment thereof, it being understood that the general statement of the objects of my invention is intended generally to explain the same without limiting it in any manner.

In the drawing:

Fig. 1 is a top perspective view of a socket installation showing an anchor ring stud member in engagement with a socket member embodying my invention;

Fig. 2 is a cross-sectional view taken along line 2—2 of the installation of Fig. 1;

Fig. 3 is a cross-sectional view of the socket member taken along line 3—3 of Fig. 2;

Fig. 4 is a cross-sectional view similar to Fig. 2 but showing the socket installation after removal of the stud member;

Fig. 5 is a cross-sectional view of the socket member taken along line 5—5 of Fig. 4.

Figure 6:
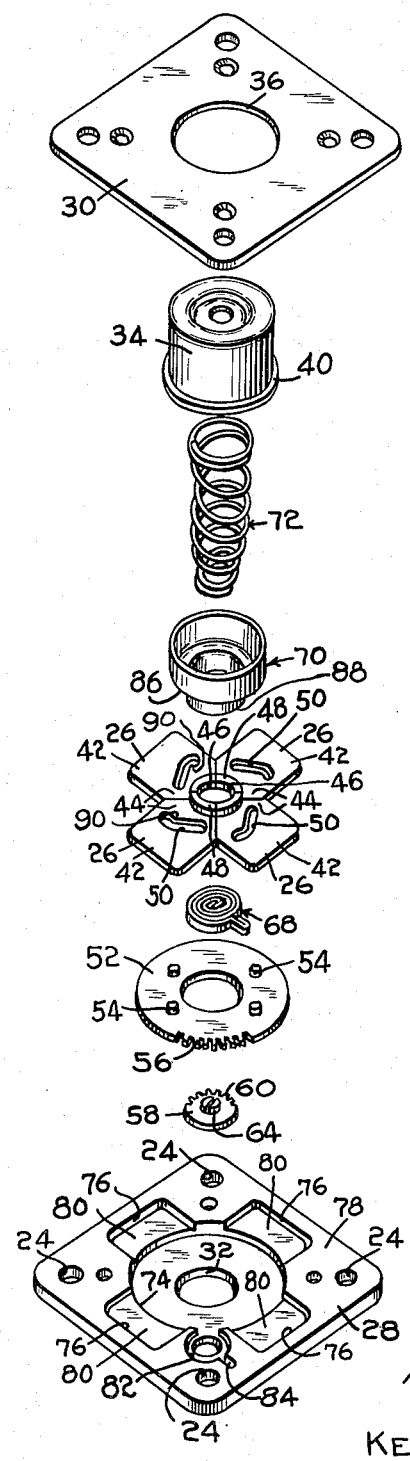
Fig. 6 is an exploded perspective bottom view of the socket member of Fig. 1.

Referring to the accompanying drawing, the socket member 10 embodying my invention is shown disposed in a recess 12 in a panel or other support 14. A stud member 16 with a groove 18 shown secured in the socket member 10. The grooved stud member shown is a type having an anchor ring 20 suitable for use as a cargo tie-down. The grooved stud 16 may, of course, be a part of or connected to any structure which one desires to secure to another member or support to which the socket member of my invention is attached. For example, the grooved stud may also be a part of a leg of a chair which it is desired to secure to a floor, or a part of or connected to any structural member which it is desired to secure to a wall or other support. The socket members may be used singly or in groups in any desired spacing and configuration in conjunction with cooperating stud members disposed with suitable spacing and configuration.

The socket member 10 is shown secured to such support or panel 14 by means of rivets 22 extending through holes or openings 24 in the socket member 10; however, any other suitable means may be used to mount the socket member 10 to a support or panel 14.

The socket member 10 is shown to comprise a housing, a set of jaw members 26, and an operating mechanism within the housing for operating the jaw members. The housing comprises a face plate 28 having an aperture 32 for receiving a grooved stud member, a back plate 30, and a cup-shaped shell member 34. The shell member extends through an aperture 36 in the back plate 30 which is shown secured to the face plate 28 by rivets 38 so that the peripheral flange 40 at one end of the shell member 34 is clamped between the two plates 28, 30. It is, of course, possible to use other methods of securing the plates together or other housing constructions within the scope of my invention.

In the embodiment shown there are four jaw members 26, each being a duplicate of the others. Each jaw member 26 has a flat body portion 42 with parallel side edges and a jaw portion 44 having edges extending inwardly from said parallel side edges at substantially 45 degrees to a jaw edge 46 comprising 90 degrees of arc. At the jaw edge 46 there may be disposed a flange 48 extending normal to the flat jaw portion. In the flat body 42 and jaw portions 44 there is disposed a slot 50 shaped, as shown in the drawing and hereinafter described, to cooperate with the jaw-operating mechanism described below. It will be readily apparent that one skilled in the art may make changes in the number of jaw members and their shapes within the scope of my invention.

The mechanism for operating the jaws includes a ring member 52 having posts 54 extending from one face for cooperative engagement in the slots 50 of the jaw members 26 and gear teeth 56 along a portion of the periphery and an operating gear member 58 having gear teeth 60 on the periphery for engagement with the gear teeth 56 of the ring member 52. This operating gear member 58 has gear teeth 60 on the periphery for engagement with the gear teeth 56 of the ring member 52. This operating gear member 58 includes head members 62, 64 at opposite sides thereof; one 62 is provided with a screwdriver slot 66 or is otherwise adapted for engagement with an operating tool such as screwdriver blade or even a coin, and the other 64 is slotted or otherwise adapted for connection with a spring member 68. The operating mechanism also includes a cup-shaped member 70 and a coil spring member 72, the purpose for which is described more fully hereinafter.

The face plate 28 has an opening 32 extending therethrough for receiving the stud member 16 and has a circular cavity 74 surrounding such opening 32 suitable for receiving the ring member 52 and disposing it in a plane spaced from the face of the face plate 28. From the circular cavity 74 there extends four recesses 76 on the under face 78 of the face plate 28 whose shape conforms to the shape of the body portion 42 of the jaw members 26 and which are spaced around the circular cavity 74 and provide a base surface 80 parallel to the face of the face plate 28 and disposed so as to be substantially in the same plane as the face of the ring member 52 from which the posts 54 extend when the ring member 52 is disposed in the circular cavity. In addition, in between a pair of the recesses 76, there is disposed a smaller circular recess 82 substantially as deep as the large circular recess for receiving the gear member 58. The small circular recess 82 connects with the large circular recess so that the teeth 60 of the gear member 58 may engage the gear teeth 56 of the ring member 52. In addition, there is an opening from the small circular recess extending through the front face of the face plate 28 to receive the slotted head 62 of the gear member 58. A slot-like recess 84 extends from the small circular recess 82 to provide means for anchoring the spring member 68.

When the mechanism is assembled, the ring member 52 is disposed in the large circular cavity 74 in a plane parallel to the face of the face plate 28 with the opening in ring member 52 in alignment with the opening 32 in the face plate 28. The jaw members 26 are disposed in the jaw member recesses 76 in a plane parallel to the face of the face plate 28 and with the posts 54 of the ring member 52 extending into the slots 50 of the jaw members 26. The back plate 30 is secured to the face plate 28 by rivets 38 extending through holes of the plates and thereby confining the mechanism into the various cavities and recesses of the housing. The cup-shaped member 70 is held by the coil spring 72 against the jaw members 26.

The slots 50 of jaw members 26 are so shaped that turning the gear member 58 causes the ring member 52 to rotate through an arc and thereby causing the posts 54 to cam along the edges of the slots 50 so as to move the jaw members 26 between two positions. One position is an open position with the jaw members 26 moved out radially as far as possible so that the jaw portions 44 are disposed under the face plate, and the second position is a closed position, wherein the jaw members are moved inwardly radially as far as possible so that the jaws underlie the opening in the face plate. When the jaw members 26 are in open position, the spring member 72 urges the cup-shaped member 70 in between the jaws 46 until a shoulder 86 of the cup member engages the flanges 48 of the jaw edges 46 and disposes the end surface 88 of the cup member flush with the face of the face plate 28. The operating spring 68 on the gear member 58 is tensioned so as to urge the gear member 58 to rotate the ring member 52 to cause the jaw members 26 to go toward closed position. However, when the jaw members 26 are in open position, the coil spring 72 forces the cup member 70 between the jaws 46 so as to hold them open. If the jaw members 26 should be in closed position the gear member 58 may be turned against the spring tension to cause the jaw members 26 to open.

The slots 50 are hooked shaped to provide adjacent the ends of the slot opposite the jaws stop portions or shoulders 90 which when the jaw members are disposed in closed position operate to prevent movement of the jaw members to open position in response to pressures on the jaw members.

As shown in Fig. 1, the face of face plate 28 may be marked adjacent the opening therein for the slotted head 62 of the gear member 58 to permit indication by the position of the slot 66 whether the jaw members are in open or in closed position.

It will also be apparent that when the jaw members 26 are in closed position they may provide jaw portions completely surrounding the stud 16 and engaging in the groove 18 through 360 degrees of arc thereby providing the strongest possible grip on the stud.

It will be understood that minor changes in the size, form and construction of the various parts of my improved fastener may be made and substituted for those herein shown and described without departing from the spirit of the invention, the scope of which is set forth in the appended claims.

I claim:

1. A fastener socket comprising a socket body, a plurality of jaw members mounted within said body and movable between an open and a closed position, operator means for moving said jaw members between said positions, locking means for securing said jaw members in said closed position, maintaining means for holding said jaw members in said open position upon interposed engagement with said jaw members, a first spring means for urging said jaw members into said closed position upon removal of said maintaining means from interposed engagement with said jaw members in open position, and a second spring means for urging said maintaining means into position for maintaining said jaw members in said open position upon the movement of said jaw members into said open position.

2. A socket fastener device for receiving and releasably engaging a grooved stud member, said device comprising a socket body having an aperture opening on one face of said socket body for receiving a stud member, a plurality of jaw members mounted within said socket body and movable between open and closed positions, said jaw members in said open position permitting unlimited entrance into the socket body through said aperture, and said jaw members in said closed position providing means for engagement in the groove of a stud extending into the socket body through said aperture, spring means for urging said jaw members from said open position into said closed position, tool driven means for moving said jaw members from said closed position into said open position, lock means for preventing lateral forces on said jaw members from moving them from said closed position to said open position, a cover member for filling said aperture when said jaw members are in open position and for maintaining said jaw members in open position, and a spring member for keeping said cover member in position and for urging said cover member from said socket body into said open position upon the opening of said jaw members.

3. A socket fastener device for receiving and releasably securing a grooved stud member, said device comprising: a socket body having a cavity and an aperture on one face opening into said cavity; a plurality of jaw members mounted within said cavity, each jaw member being movable in a radial direction with respect to said aperture between an open position and a closed position, in closed position said jaw members cooperating to provide means for gripping engagement in a groove of a stud member extending into said cavity through said aperture; an operator member operatively connected to said jaw members and mounted within said cavity so as to be movable between two positions corresponding to said open and closed positions; external means for moving said operator member between said two positions; a spring member biased to urge said operator member to urge said jaw members into said closed position; and a plunger member disposed within said cavity dimensioned to fill said aperture and spring biased to extend between said jaw members into said aperture when said jaw members are in open position.

4. A socket fastener device for receiving and releasably securing a grooved stud member, said device comprising: a housing having an aperture extending through one face for receiving a grooved stud; a plurality of gripping members disposed within said housing; an operating member movable between a first and a second position and including a plurality of posts extending therefrom, each of said gripping members having camming surfaces in engagement with a corresponding one of said posts; the camming surfaces of said gripping members being so disposed that movement of said operating member between said first and second positions will cause said posts to move said gripping members between an open and a closed position; said gripping members having jaw portions which, when said gripping members are in closed position, abut each other in a manner suitable for engagement with a groove of a stud member extending through said aperture and which, when said gripping members are in open position, are spaced apart and underlie said one face; and a cup-shaped member disposed within the housing and a spring biased to urge the closed end of said cup-shaped member into the aperture of the housing between the jaw portions of the gripping members when the gripping members are disposed in open position, said cup-shaped member having a shoulder for limiting the movement thereof.

5. A socket fastener in accordance with claim 4 wherein the camming surfaces of the gripping members include shoulders for locking the gripping members in closed position against forces tending to move said gripping members to open position.

6. A socket fastener device for receiving and releasably securing a grooved stud member, said device comprising: a housing having an aperture extending through one face for receiving a grooved stud; a plurality of gripping members disposed within said housing in a plane parallel to said one face and having slots therein; a flat ring member having a central opening in alignment with said aperture and being disposed in a plane parallel to said one face; said flat ring member having posts extending therefrom into the slots of said gripping members and being rotatable between a first and a second position; a rotating member operable from the exterior of the housing and having an operating connection to said ring member; a spring member tensioning said rotating member so as to urge said gripping members into closed position; said gripping members having camming surfaces bounding the slots therein, said camming surfaces being so disposed that movement of said ring member between said first and second positions will cause said posts to move said gripping members between an open and a closed position; said gripping members having jaw portions which, when said gripping members are in closed position, abut each other in a manner suitable for engagement with a groove of a stud member extending through said aperture and which, when said gripping members are in open position, are spaced apart and underlie said one face; and a cup-shaped member disposed within the housing and a second spring member biased to urge the base of said cup-shaped member into the aperture of the housing between the jaw portions of the gripping members when the gripping members are disposed in open position, said cup-shaped member having a shoulder for limiting the movement thereof.

7. A socket fastener in accordance with claim 6 wherein the camming surfaces of the gripping members include shoulders for locking the gripping members in closed position against forces tending to move said gripping members to open position.

8. A socket fastener device for receiving and releasably securing a grooved stud member, said device comprising: a housing having an aperture extending through one face for receiving a grooved stud; a plurality of gripping members disposed within said housing; an operating member movable between a first and a second position and including a plurality of posts extending therefrom, each of said gripping members having camming surfaces in engagement with a corresponding one of said posts; the camming surfaces of said gripping members being so disposed that movement of said operating member between said first and second positions will cause said posts to move said gripping members between an open and a closed position; said gripping members having jaw portions which, when said gripping members are in closed position, abut each other in a manner suitable for engagement with a groove of a stud member extending through said aperture and which, when said gripping members are in open position, are spaced apart and underlie said one face; and a cup-shaped member disposed within the housing and a spring biased to urge the closed end of said cup-shaped member into the aperture of the housing between the jaw portions of the gripping members when the gripping members are disposed in open position.

9. A socket fastener device for receiving and releasably securing a grooved stud member, said device comprising: a housing having an aperture extending through one face for receiving a grooved stud; a plurality of gripping members disposed within said housing in a plane parallel to said one face and having slots therein; a flat ring member having a central opening in alignment with said aperture and being disposed in a plane parallel to said one face; said flat ring member having posts extending therefrom into the slots of said gripping members and being rotatable between a first and a second position; a spring member tensioning said rotating member so as to urge said gripping members into closed position; said gripping members having camming surfaces bounding the slots therein, said camming surfaces being so disposed that movement of said ring member between said first and second positions will cause said posts to move said gripping members between an open and a closed position; said gripping members having jaw portions which, when said gripping members are in closed position, abut each other in a manner suitable for engagement with a groove of a stud member extending through said aperture and which, when said gripping members are in open position, are spaced apart and underlie said one face; and a cup-shaped member disposed within the housing and a second spring member biased to urge the base of said cup-shaped member into the aperture of the housing between the jaw portions of the gripping members when the gripping members are disposed in open position.

KERIAN J. SHOMBER.

References Cited in the file of this patent

UNITED STATES PATENTS

| Number | Name | Date |
|---|---|---|
| 822,562 | Tucker | June 5, 1906 |
| 1,735,620 | Salley | Nov. 12, 1929 |

FOREIGN PATENTS

| Number | Country | Date |
|---|---|---|
| 935,529 | France | Feb. 2, 1948 |